(12) United States Patent
Hsiang et al.

(10) Patent No.: US 12,405,505 B2
(45) Date of Patent: Sep. 2, 2025

(54) DISPLAY DEVICE

(71) Applicant: Acer Incorporated, New Taipei (TW)

(72) Inventors: Jui-Chieh Hsiang, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 539 days.

(21) Appl. No.: 17/964,858

(22) Filed: Oct. 12, 2022

(65) Prior Publication Data
US 2023/0350265 A1    Nov. 2, 2023

(30) Foreign Application Priority Data
Apr. 29, 2022    (TW) .................................. 111116363

(51) Int. Cl.
| | | |
|---|---|---|
| *G02F 1/1676* | (2019.01) | |
| *G02F 1/1343* | (2006.01) | |
| *G02F 1/16756* | (2019.01) | |
| *G02F 1/1685* | (2019.01) | |

(52) U.S. Cl.
CPC ...... *G02F 1/1676* (2019.01); *G02F 1/134345* (2021.01); *G02F 1/16756* (2019.01); *G02F 1/1685* (2019.01)

(58) Field of Classification Search
None
See application file for complete search history.

(56) References Cited

U.S. PATENT DOCUMENTS

| | | | | |
|---|---|---|---|---|
| 6,108,067 A | * | 8/2000 | Okamoto | G02F 1/133382 349/149 |
| 6,812,911 B2 | * | 11/2004 | Makishima | G09G 3/3655 345/92 |
| 8,692,971 B2 | * | 4/2014 | Chiu | G02B 30/27 349/200 |
| 10,048,547 B2 | * | 8/2018 | Ho | G02F 1/133707 |
| 10,866,465 B2 | * | 12/2020 | Pan | G02F 1/13439 |
| 11,087,644 B2 | | 8/2021 | Paolini, Jr. et al. | |
| 11,366,346 B2 | * | 6/2022 | Huang | G02F 1/1343 |
| 2005/0088582 A1 | * | 4/2005 | Park | G02F 1/134309 349/43 |
| 2007/0052909 A1 | * | 3/2007 | Chou | G02F 1/1339 349/155 |

(Continued)

FOREIGN PATENT DOCUMENTS

| | | |
|---|---|---|
| CN | 113759630 | 12/2021 |
| TW | 699605 | 7/2020 |

*Primary Examiner* — Fred Tzeng
(74) *Attorney, Agent, or Firm* — JCIPRNET

(57) ABSTRACT

A display device including a first substrate, a second substrate, a first electrode, a second electrode and a display medium layer is provided. The first electrode entirely covers a surface of the first substrate and is provided with a first voltage input terminal, a second voltage input terminal and a third voltage input terminal. The first voltage input terminal and the second voltage input terminal are respectively located on two opposite side edges of the first electrode. The third voltage input terminal is located between the first voltage input terminal and the second voltage input terminal. The second electrode entirely covers a surface of the second substrate and is provided with a fourth voltage input terminal and a fifth voltage input terminal. The fourth voltage input terminal and the fifth voltage input terminal are respectively located on two opposite side edges of the second electrode.

20 Claims, 12 Drawing Sheets

(56) References Cited

U.S. PATENT DOCUMENTS

| | | | |
|---|---|---|---|
| 2009/0015737 A1* | 1/2009 | Jung | G02B 30/28 |
| | | | 349/200 |
| 2009/0185125 A1* | 7/2009 | Hida | G02F 1/134363 |
| | | | 349/141 |
| 2010/0201900 A1* | 8/2010 | Lee | G02F 1/13452 |
| | | | 349/40 |
| 2011/0102698 A1* | 5/2011 | Wang | G02F 1/13338 |
| | | | 349/54 |
| 2011/0317086 A1* | 12/2011 | Wang | G02F 1/1362 |
| | | | 349/73 |
| 2015/0002779 A1* | 1/2015 | Joten | G02F 1/133308 |
| | | | 349/59 |
| 2019/0278146 A1* | 9/2019 | He | G02F 1/136286 |
| 2021/0223619 A1* | 7/2021 | Zhou | G02F 1/13338 |

* cited by examiner

DISPLAY DEVICE

CROSS-REFERENCE TO RELATED APPLICATION

This application claims the priority benefit of Taiwan application serial no. 111116363, filed on Apr. 29, 2022. The entirety of the above-mentioned patent application is hereby incorporated by reference herein and made a part of this specification.

BACKGROUND

Field of the Disclosure

The present disclosure relates to a display device, and more particularly, to a display device having a radiation gradient grayscale display effect.

DESCRIPTION OF RELATED ART

A bistable display is a display that uses a bistable medium for display, and the technologies for achieving bistable display include electronic ink (E-Ink) display, cholesteric liquid crystal display (ChLCD), electro-phoretic display (EPD), electrowetting display (EWD) or quick response-liquid powder display (QR-LPD).

Compared with mainstream displays (such as liquid crystal displays or light-emitting diode displays), bistable display has lower operating power consumption and better flexibility. In addition to being suitable for applications in portable electronic products (such as e-paper or e-book), bistable display may also be applied to the casing of various electronic products or car body to achieve the effect of changing visual appearance. However, limited by the existing driving method, the bistable display cannot produce the radiation gradient grayscale display effect.

SUMMARY OF THE DISCLOSURE

The present disclosure provides a display device that may achieve a radiation gradient grayscale display effect.

A display device of the disclosure includes a first substrate, a second substrate, a first electrode, a second electrode and a display medium layer. The first substrate and the second substrate are disposed opposite to each other. The first electrode entirely covers a surface of the first substrate and is provided with a first voltage input terminal, a second voltage input terminal and a third voltage input terminal. The first voltage input terminal and the second voltage input terminal are respectively located on two opposite side edges of the first electrode. The third voltage input terminal is located between the first voltage input terminal and the second voltage input terminal. The second electrode entirely covers a surface of the second substrate and is provided with a fourth voltage input terminal and a fifth voltage input terminal. The fourth voltage input terminal and the fifth voltage input terminal are respectively located on two opposite side edges of the second electrode. The display medium layer is disposed between the first electrode and the second electrode.

In an embodiment of the present disclosure, the first voltage input terminal, the second voltage input terminal, the third voltage input terminal, the fourth voltage input terminal and the fifth voltage input terminal of the display device are respectively used for inputting the first voltage, the second voltage, the third voltage, the fourth voltage and the fifth voltage. The third voltage is greater or less than the first voltage and the second voltage, and the fourth voltage is different from the fifth voltage.

In an embodiment of the present disclosure, the display device further includes a third electrode and a first insulating layer. The third electrode is disposed on one side of the first electrode facing away from the second electrode. The third electrode has a first end portion and a first extension portion. The first end portion is a third voltage input terminal. The first extension portion extends from the first end portion to a side edge of the first substrate. The first insulating layer is disposed between the first extension portion and the first electrode.

In an embodiment of the present disclosure, the third electrode and the first insulating layer of the display device are located between the first substrate and the first electrode. The first insulating layer covers the third electrode, and the first end portion penetrates through the first insulating layer to electrically contact the first electrode.

In an embodiment of the present disclosure, the third electrode and the first insulating layer of the display device are located on one side of the first substrate facing away from the first electrode. The first insulating layer is located between the first substrate and the first extension portion, and the first end portion of the third electrode is electrically coupled to the first electrode.

In an embodiment of the present disclosure, the first electrode, the third electrode and the first insulating layer of the display device are located on one side of the first substrate facing away from the display medium layer, and the first end portion of the third electrode is in electrical contact with the first electrode.

In an embodiment of the present disclosure, the display device further includes a fourth electrode and a second insulating layer. The fourth electrode is disposed on one side of the second electrode facing away from the first electrode. The fourth electrode has a second end portion and a second extension portion. The second extension portion extends from the second end portion to a side edge of the second substrate. The second insulating layer is disposed between the second extension portion and the second electrode. The second electrode is further provided with a sixth voltage input terminal located between the fourth voltage input terminal and the fifth voltage input terminal, and the second end portion of the fourth electrode is the sixth voltage input terminal.

In an embodiment of the present disclosure, the first voltage input terminal, the second voltage input terminal, the third voltage input terminal, the fourth voltage input terminal, the fifth voltage input terminal and the sixth voltage input terminal of the display device are respectively used for inputting the first voltage, the second voltage, the third voltage, the fourth voltage, the fifth voltage and the sixth voltage. The third voltage is greater or less than the first voltage and the second voltage, and the sixth voltage is greater or less than the fourth voltage and the fifth voltage.

In an embodiment of the present disclosure, the display device further includes a first flexible circuit board and a second flexible circuit board. The second electrode is further provided with a sixth voltage input terminal located between the fourth voltage input terminal and the fifth voltage input terminal. The first substrate, the first electrode and the display medium layer have openings. The opening exposes the sixth voltage input terminal of the second electrode. The first flexible circuit board is electrically connected to the third voltage input terminal. The second flexible circuit board is electrically connected to the sixth voltage input terminal through the opening.

In an embodiment of the present disclosure, the opening of the display device further exposes the third voltage input terminal of the first electrode, and the first flexible circuit board is electrically connected to the third voltage input terminal through the opening.

In an embodiment of the present disclosure, the first electrode of the display device is disposed on one side of the first substrate facing away from the display medium layer.

In an embodiment of the present disclosure, the first substrate, the display medium layer and the first electrode of the display device have openings. The display device further includes a light guide structure, a light source and a patterned ink layer. The patterned ink layer is disposed on the second substrate and overlaps the opening. The light guide structure extends into the opening and is adapted to guide light from the light source to pass through the patterned ink layer.

In an embodiment of the present disclosure, the material of the display medium layer of the display device includes a bistable material.

Based on the above, in the display device of an embodiment of the present disclosure, two surfaces of two substrates facing each other are entirely covered with two electrodes respectively, and the two opposite side edges of the two electrodes are respectively provided with two voltage input terminals. By arranging another independently controllable voltage input terminal between two voltage input terminals of one of the electrodes, the display medium layer interposed between the two electrodes may achieve the radiation gradient grayscale display effect.

DESCRIPTION OF EMBODIMENTS

Figure 1:
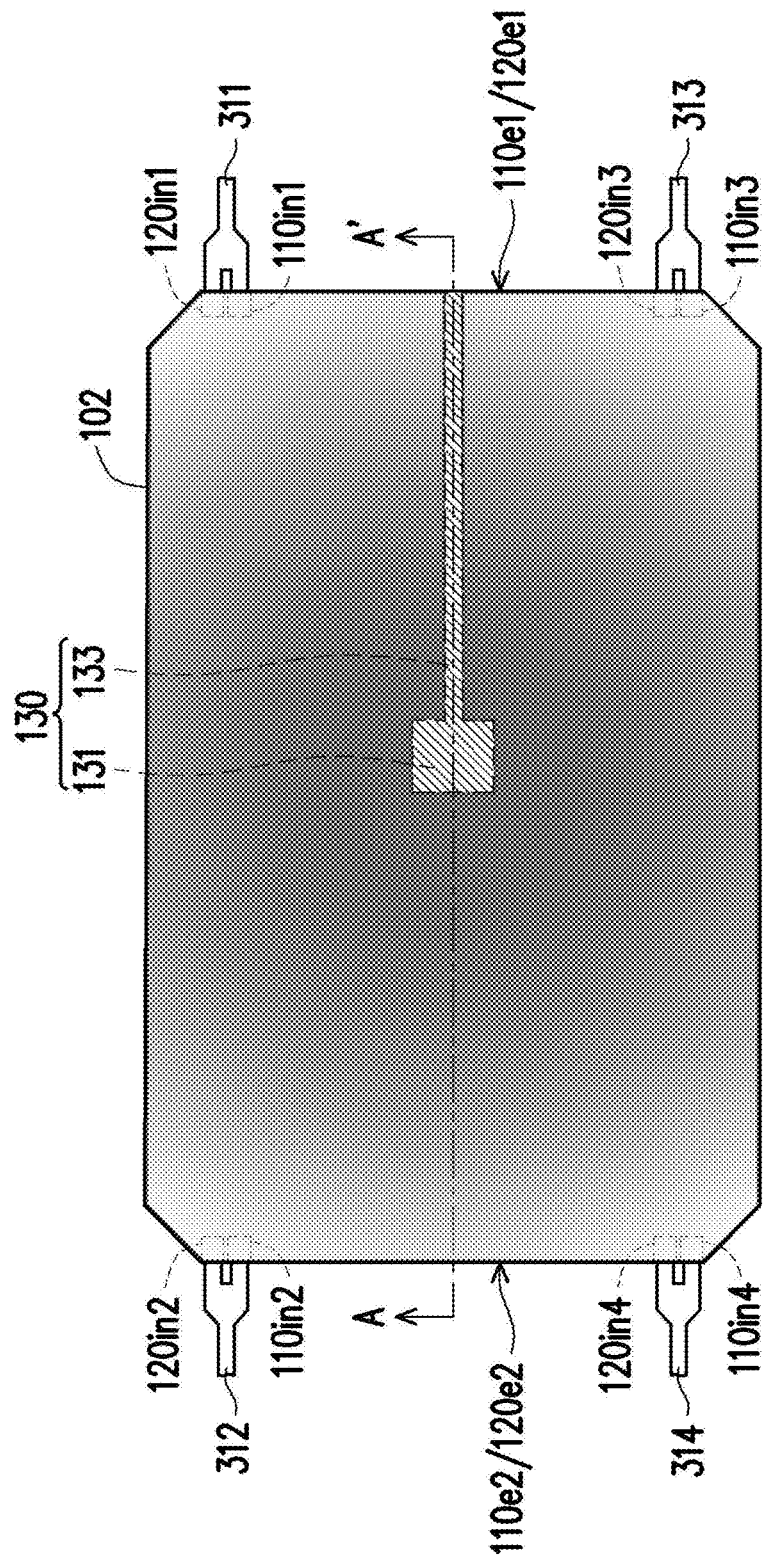
FIG. 1 is a schematic top view of a display device according to a first embodiment of the present disclosure.

In the drawings, the thickness of layers, films, panels, regions, etc., are exaggerated for clarity. It should be understood that when an element such as a layer, film, region or substrate is referred to as being "on" or "connected to" another element, it can be directly on or connected to the other element, or an intermediate element may also be present. In contrast, when an element is referred to as being "directly on" or "directly connected to" another element, there are no intermediate elements therebetween. As used herein, "connected" may refer to a physical and/or electrical connection. Furthermore, the "electrical connection" may refer to the existence of other elements between two elements.

Reference will now be made in detail to exemplary embodiments of the present disclosure, examples of which are illustrated in the accompanying drawings. Wherever possible, the same reference numerals are used in the drawings and description to refer to the same or like parts.

Figure 2:
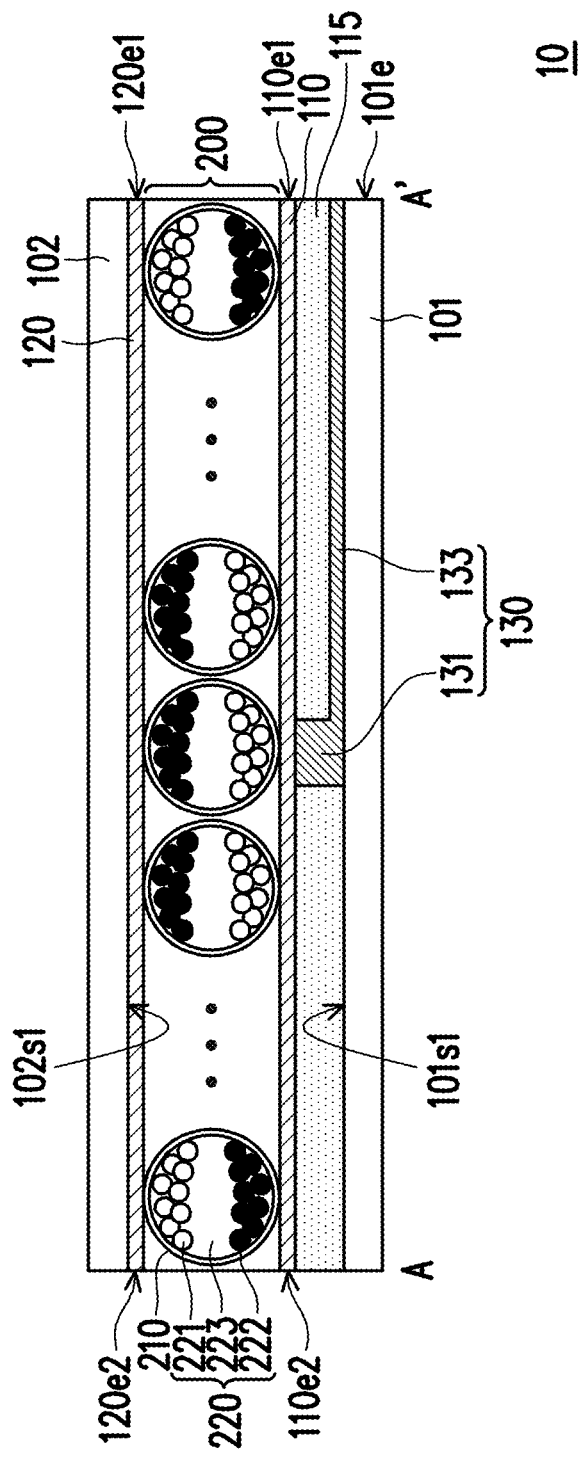
FIG. 2 is a schematic cross-sectional view of the display device of FIG. 1.
Figure 3:
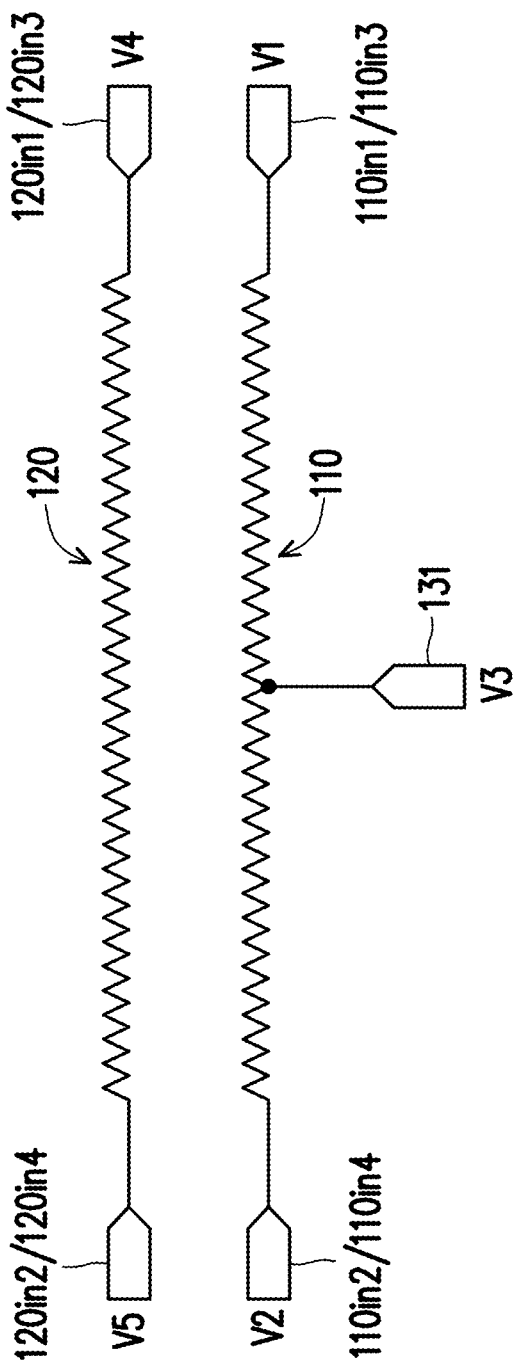
FIG. 3 is an equivalent circuit diagram of the display device of FIG. 2.

FIG. 1 is a schematic top view of a display device according to a first embodiment of the present disclosure. FIG. 2 is a schematic cross-sectional view of the display device of FIG. 1. FIG. 3 is an equivalent circuit diagram of the display device of FIG. 2. FIG. 2 corresponds to the sectional line A-A' of FIG. 1. Referring to FIG. 1 and FIG. 2, the display device 10 includes a first substrate 101, a second substrate 102, a first electrode 110, a second electrode 120 and a display medium layer 200. The first substrate 101 and the second substrate 102 are disposed opposite to each other. The first electrode 110 entirely covers a surface of the first substrate 101. The second electrode 120 entirely covers a surface of the second substrate 102. The display medium layer 200 is disposed between the first substrate 101 and the second substrate 102. In this embodiment, the first electrode 110 and the second electrode 120 are respectively disposed on two opposite surfaces $101s1$ and $102s1$ of the first substrate 101 and the second substrate 102, but the disclosure is not limited thereto.

The materials of the first substrate 101 and the second substrate 102 may include glass, quartz, high molecular polymers (such as polyimide, polycarbonate or polyethylene terephthalate), or other flexible plates with high light-transmittance. The first electrode 110 and the second electrode 120 are, for example, light-transmitting electrodes, and the material of the light-transmitting electrodes includes metal oxides, such as indium tin oxide, indium zinc oxide, aluminum tin oxide, aluminum zinc oxide oxides, or other suitable oxides, or a stacked layer of at least two of the above, but the disclosure is not limited thereto. In some embodiments, the material of the first electrode 110 and/or the second electrode 120 may also be selected from metal materials (e.g., molybdenum, aluminum, copper, etc.).

The display medium layer 200 may include a plurality of microcapsules 210 and an electronic ink 220 filled in the microcapsules 210. The electronic ink 220 may optionally include a plurality of white particles 221, a plurality of black particles 222 and a transparent liquid 223, and one of the white particles 221 and the black particles 222 may be positively charged and the other negatively charged. That is, in this embodiment, the material of the display medium layer 200 may be an electrophoretic display (EPD) material.

However, the present disclosure is not limited thereto. According to other embodiments, the display medium layer may also be a Liquid Powder Display (LPD) material, a Cholesteric Liquid-Crystal (CLC) material, Microelectromechanical Systems (MEMS), an Electrochromic Display (ECD) material, a Polymer-Dispersed Liquid Crystal (PDLC) material, or other suitable bistable medium.

Further, the first electrode 110 and the second electrode 120 may be provided with a plurality of voltage input terminals. For example, the two opposite side edges 110e1 and 110e2 of the first electrode 110 may be provided with a voltage input terminal 110in1, a voltage input terminal 110in2, a voltage input terminal 110in3 and a voltage input terminal 110in4, and two opposite side edges 120e1 and 120e2 of the second electrode 120 may be provided with a voltage input terminal 120in1, a voltage input terminal 120in2, a voltage input terminal 120in3 and a voltage input terminal 120in4.

In this embodiment, the display device 10 may further include a third electrode 130 disposed on one side of the first electrode 110 facing away from the second electrode 120. The third electrode 130 has an end portion 131 and an extension portion 133. The end portion 131 may be substantially disposed on the first substrate 101 and at a position away from the edge of the substrate, such as a geometric center of the first substrate 101 (as shown in FIG. 1) or other positions deviated from the geometric center and away from the edge of the substrate.

On the other hand, the extension portion 133 may extend from the end portion 131 to the side edge 101e of the first substrate 101, and an insulating layer 115 is provided between the extension portion 133 of the third electrode 130 and the first electrode 110. In order to reduce the capacitive coupling effect between the extension portion 133 of the third electrode 130 and the first electrode 110, the material of the insulating layer 115 may be selected from an insulating material with a high dielectric constant. For example, in this embodiment, the third electrode 130 and the insulating layer 115 are located between the first substrate 101 and the first electrode 110, the insulating layer 115 covers the third electrode 130, and the end portion 131 of the third electrode 130 penetrates through the insulating layer 115 to electrically contact the first electrode 110, but the disclosure is not limited thereto.

Since the end portion 131 of the third electrode 130 is in electrical contact with the first electrode 110 at the geometric center of the first substrate 101, the end portion 131 may serve as the geometric center of the first electrode 110 at the first substrate 101 or another voltage input terminal in the proximity thereof. Please also refer to FIG. 3, for example, the voltage input terminal 110in1 (or the voltage input terminal 110in3) located on the side edge 110e1 of the first electrode 110 may be used as a first voltage input terminal for inputting the first voltage V1. The voltage input terminal 110in2 (or the voltage input terminal 110in4) located at another side edge 110e2 of the first electrode 110 may be used as a second voltage input terminal for inputting the second voltage V2. The end portion 131 of the third electrode 130 located between the first voltage input terminal and the second voltage input terminal may serve as a third voltage input terminal for inputting the third voltage V3.

Similarly, the voltage input terminal 120in1 (or the voltage input terminal 120in3) located at the side edge 120e1 of the second electrode 120 may be used as the fourth voltage input terminal for inputting the fourth voltage V4. The voltage input terminal 120in2 (or the voltage input terminal 120in4) located at another side edge 120e2 of the second electrode 120 may be used as the fifth voltage input terminal for inputting the fifth voltage V5.

In this embodiment, when the display device 10 is enabled to display, the third voltage V3 input to the first electrode 110 may be greater or less than the first voltage V1 and the second voltage V2, and the fourth voltage V4 input to the second electrode 120 is different from the fifth voltage V5. That is to say, the potential distribution on the first electrode 110 gradually increases or decreases from the third voltage input terminal (i.e., the end portion 131 of the third electrode 130) to the first voltage input terminal and the second voltage input terminal on both side edges, and the potential distribution on the second electrode 120 gradually increases or decreases from the fourth voltage input terminal at one side edge 120e1 to the fifth voltage input terminal at another side edge 120e2. Accordingly, the display medium layer 200 sandwiched between the first electrode 110 and the second electrode 120 may achieve the radiation gradient grayscale display effect.

As shown in FIG. 1, the display grayscale of the display device 10 may exhibit a gradient effect increasing from the end portion 131 of the third electrode 130 (i.e., the third voltage input terminal of the first electrode 110) as the center to the periphery, that is, radiation grayscale gradient effect. It should be noted that, by adjusting the relative magnitude relationship of the third voltage V3 with respect to the first voltage V1 and the second voltage V2, the display grayscale of the display device 10 may also exhibit a radiation display effect that reduces gradually from the end portion 131 (or the geometric center of first substrate 101) of the third electrode 130 as the center to the periphery.

In this embodiment, the display device 10 further includes a flexible circuit board 311, a flexible circuit board 312, a flexible circuit board 313, and a flexible circuit board 314. For example, each of these flexible circuit boards may have two sets of bonding pins, one of which may be electrically connected to a voltage input terminal of the first electrode 110, and the other set may be electrically connected to a voltage input terminal of the second electrode 120. For example, one set of bonding pins of the flexible circuit board 311 is electrically connected to the voltage input terminal 110in1 on the first electrode 110, and the other set of bonding pins is electrically connected to the voltage input terminal 120in1 on the second electrode 120 and so on, but the disclosure is not limited thereto.

Other embodiments will be listed below to describe the present disclosure in detail, and the same components will be marked with the same symbols, and the description of the same technical content will be omitted. For omitted parts, please refer to the foregoing embodiments, which will not be repeated below.

Figure 4:
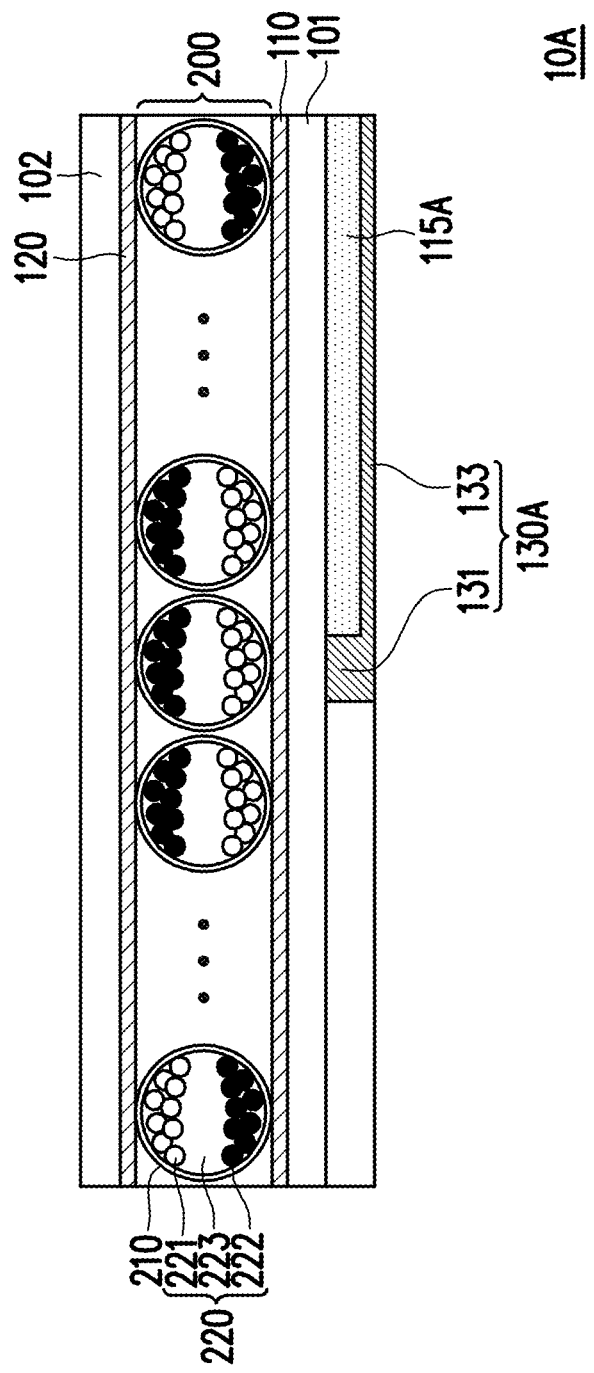
FIG. 4 is a schematic cross-sectional view of the display device of a second embodiment of the present disclosure.

FIG. 4 is a schematic cross-sectional view of the display device of a second embodiment of the present disclosure. Referring to FIG. 4, the only difference between the display device 10A of the present embodiment and the display device 10 of FIG. 2 is that the configuration of the third electrode and the insulating layer is different. Specifically, the third electrode 130A and the insulating layer 115A of the display device 10A are disposed on one side of the first substrate 101 facing away from the first electrode 110, and the insulating layer 115A is located between the first substrate 101 and the extension portion 133 of the third electrode 130A. It should be noted that, in this embodiment, the end portion 131 of the third electrode 130A is not directly in electrical contact with the first electrode 110, but is electrically coupled to the first electrode 110. That is, the end portion 131 of the third electrode 130A changes the charge distribution of the first electrode 110 near the end portion 131 through the capacitive coupling effect, thereby changing the electric potential at the position.

Figure 5:
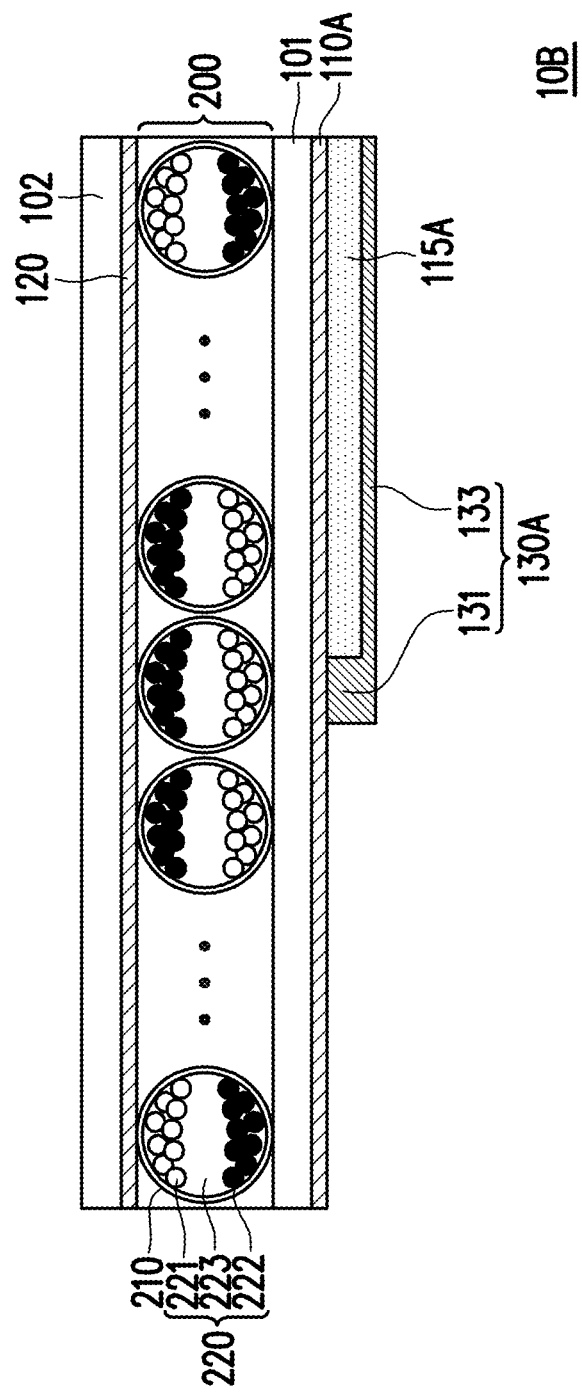
FIG. 5 is a schematic cross-sectional view of a display device according to a third embodiment of the present disclosure.

FIG. 5 is a schematic cross-sectional view of a display device according to a third embodiment of the present disclosure. Referring to FIG. 5, the only difference between the display device 10B of this embodiment and the display device 10A of FIG. 4 is that the configuration of the first electrode is different. Specifically, the first electrode 110A, the third electrode 130A and the insulating layer 115A of the display device 10B are disposed on one side of the first substrate 101 facing away from the display medium layer 200. Unlike the third electrode 130A in FIG. 4 that is electrically coupled to the first electrode 110, the end portion 131 of the third electrode 130A in this embodiment is in direct electrical contact with the first electrode 110A also located outside the first substrate 101.

Figure 6:
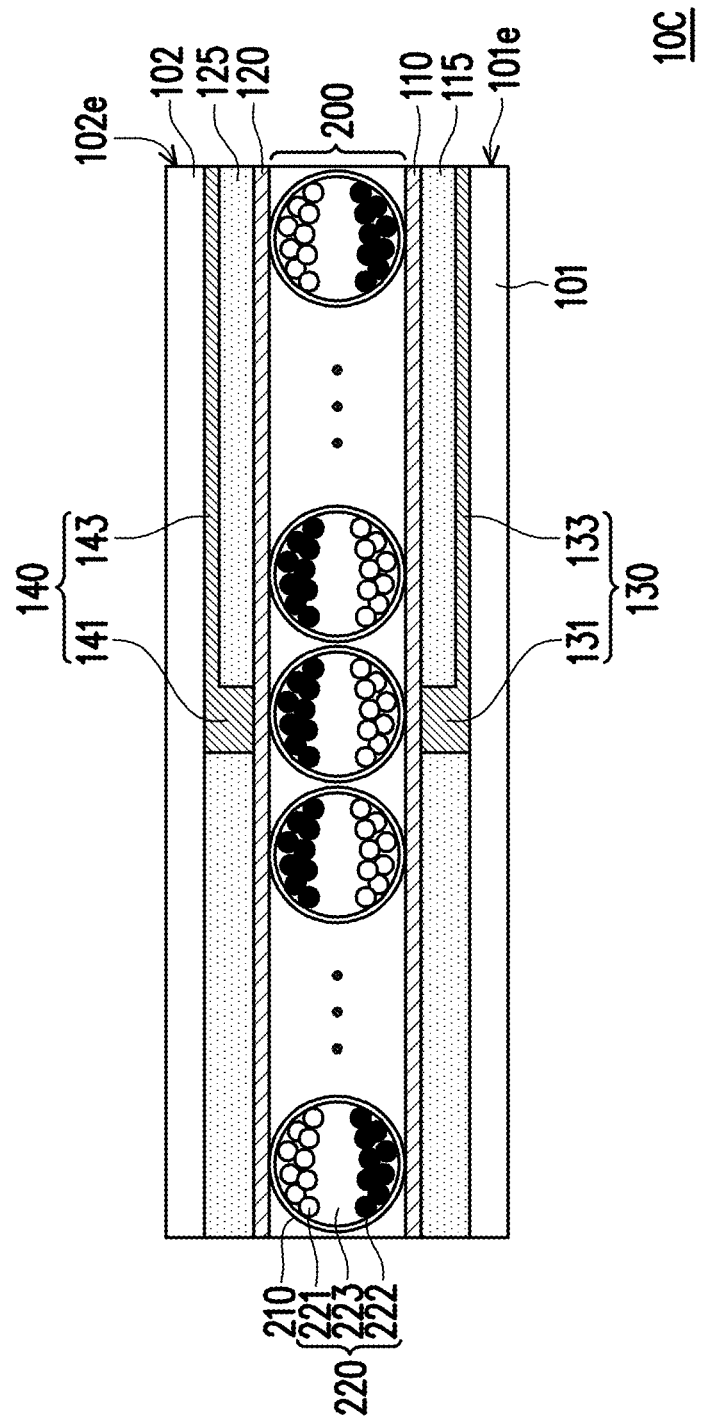
FIG. 6 is a schematic cross-sectional view of a display device according to a fourth embodiment of the present disclosure.
Figure 7:
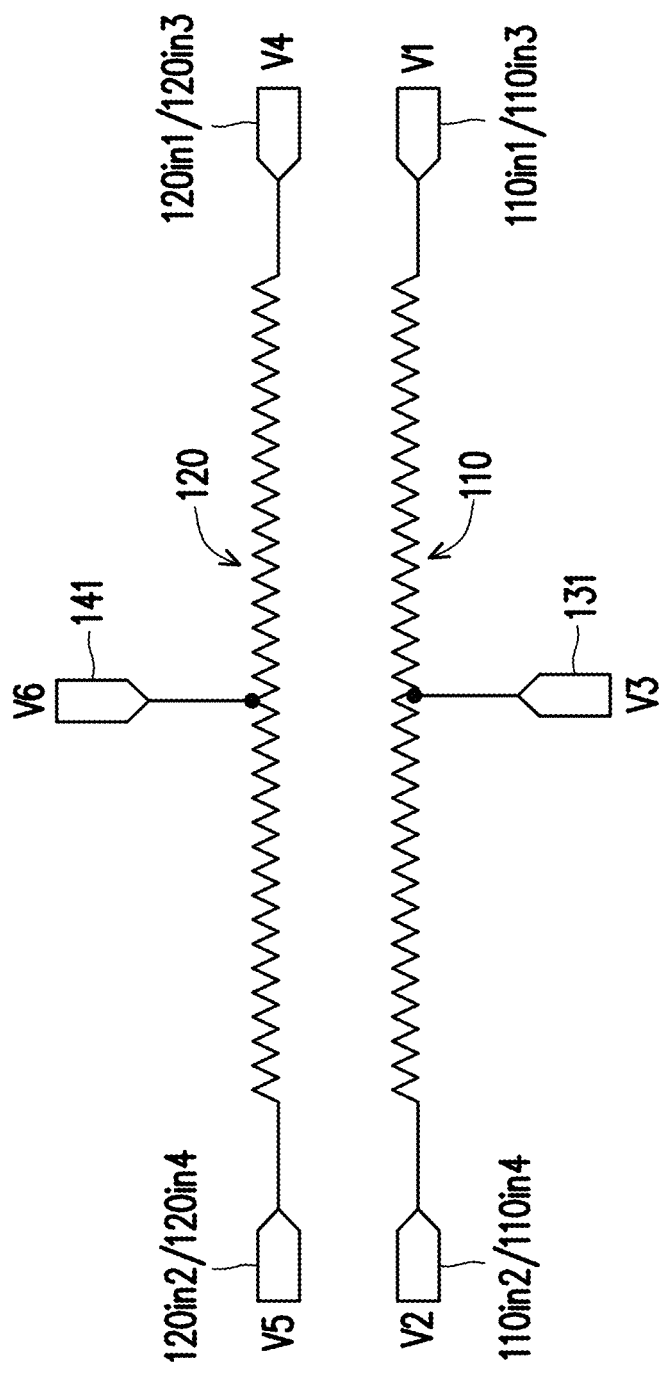
FIG. 7 is an equivalent circuit diagram of the display device of FIG. 6.

FIG. 6 is a schematic cross-sectional view of a display device according to a fourth embodiment of the present disclosure. FIG. 7 is an equivalent circuit diagram of the display device of FIG. 6. Referring to FIG. 6 and FIG. 7, the only difference between the display device 10C of this embodiment and the display device 10 of FIG. 2 is that the display device 10C further includes a fourth electrode 140 and an insulating layer 125. The fourth electrode 140 is disposed on one side of the second electrode 120 facing away from the first electrode 110, and has an end portion 141 and an extension portion 143. Similar to the third electrode 130, the end portion 141 of the fourth electrode 140 may be substantially disposed on the second substrate 102 and at a position away from the edge of the substrate, such as the geometric center of the second substrate 102 (as shown in FIG. 6) or other positions deviated from the geometric center and away from the edge of the substrate.

On the other hand, the extension portion 143 may extend from the end portion 141 to the side edge 102e of the second substrate 102, and an insulating layer 125 is provided between the extension portion 143 of the fourth electrode 140 and the second electrode 120. In order to reduce the capacitive coupling effect between the extension portion 143 of the fourth electrode 140 and the second electrode 120, the material of the insulating layer 125 may be selected from an insulating material with a high dielectric constant. For example, in this embodiment, the fourth electrode 140 and the insulating layer 125 are located between the second substrate 102 and the second electrode 120, the insulating layer 125 covers the fourth electrode 140, and the end portion 141 of the fourth electrode 140 penetrates through the insulating layer 125 to be in electrical contact with the second electrode 120, but the disclosure is not limited thereto.

Since the end portion 141 of the fourth electrode 140 is in electrical contact with the second electrode 120 at the geometric center of the second substrate 102, the end portion 141 may serve as the geometric center of the second electrode 120 at the second substrate 102 or another voltage input terminal in the proximity thereof. For example, the end portion 141 of the fourth electrode 140 located between the fourth voltage input terminal and the fifth voltage input terminal may be used as a sixth voltage input terminal for inputting the sixth voltage V6 (as shown in FIG. 7).

In the present embodiment, when the display device 10C is enabled to display, the third voltage V3 input to the first electrode 110 may be greater than or less than the first voltage V1 and the second voltage V2, and the sixth voltages V6 input to the second electrode 120 may be greater or less than the fourth voltage V4 and the fifth voltage V5. That is to say, the potential distribution on the first electrode 110 gradually increases or decreases from the third voltage input terminal (i.e., the end portion 131 of the third electrode 130) to the first voltage input terminal and the second voltage input terminal on both side edges, and the potential distribution on the second electrode 120 gradually increases or decreases from the sixth voltage input terminal (i.e., the end portion 141 of the fourth electrode 140) to the fourth voltage input terminal and the fifth voltage input terminal on both side edges. Accordingly, the display medium layer 200 sandwiched between the first electrode 110 and the second electrode 120 may achieve the radiation gradient grayscale display effect.

Figure 8:
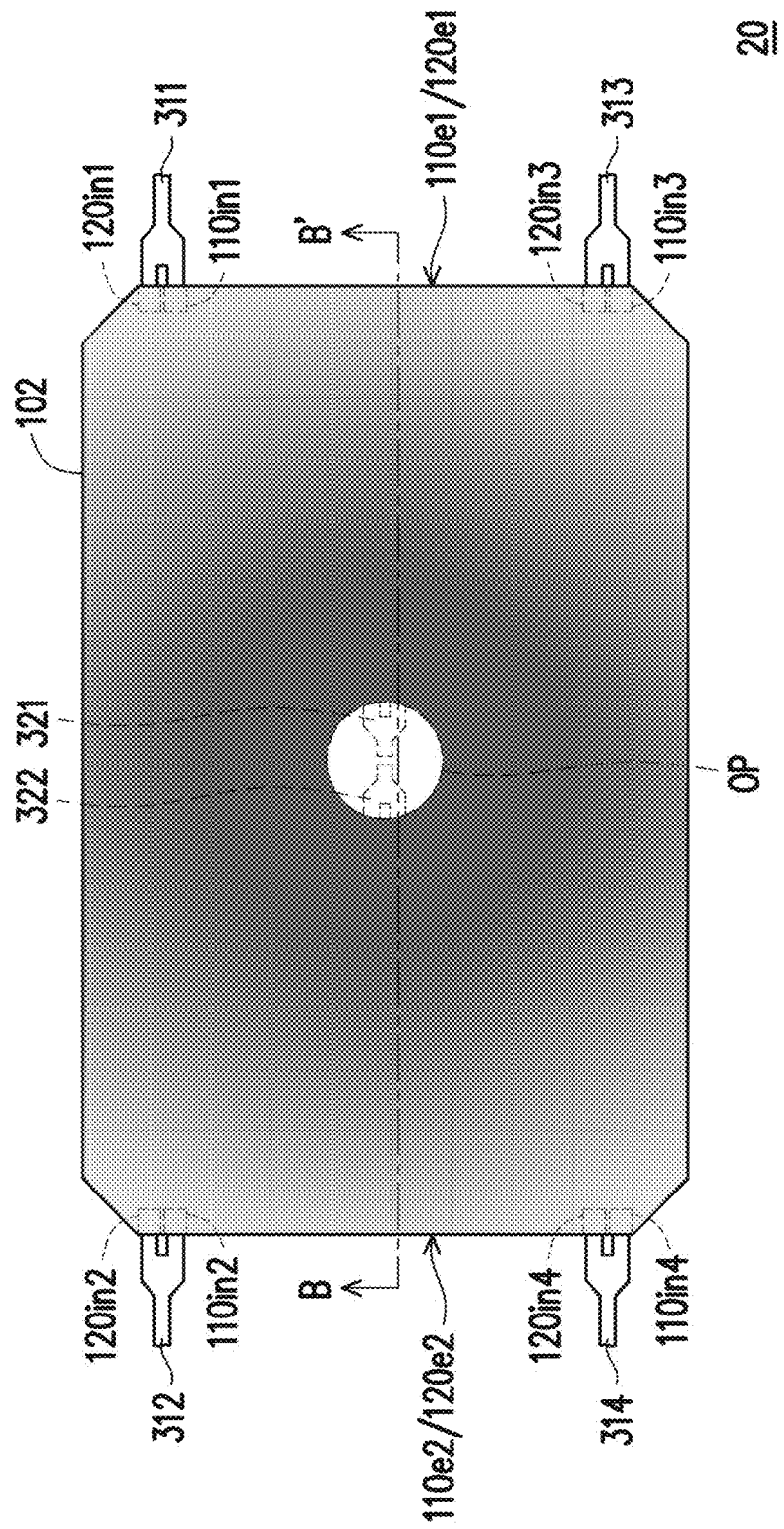
FIG. 8 is a schematic top view of a display device according to a fifth embodiment of the present disclosure.
Figure 9:
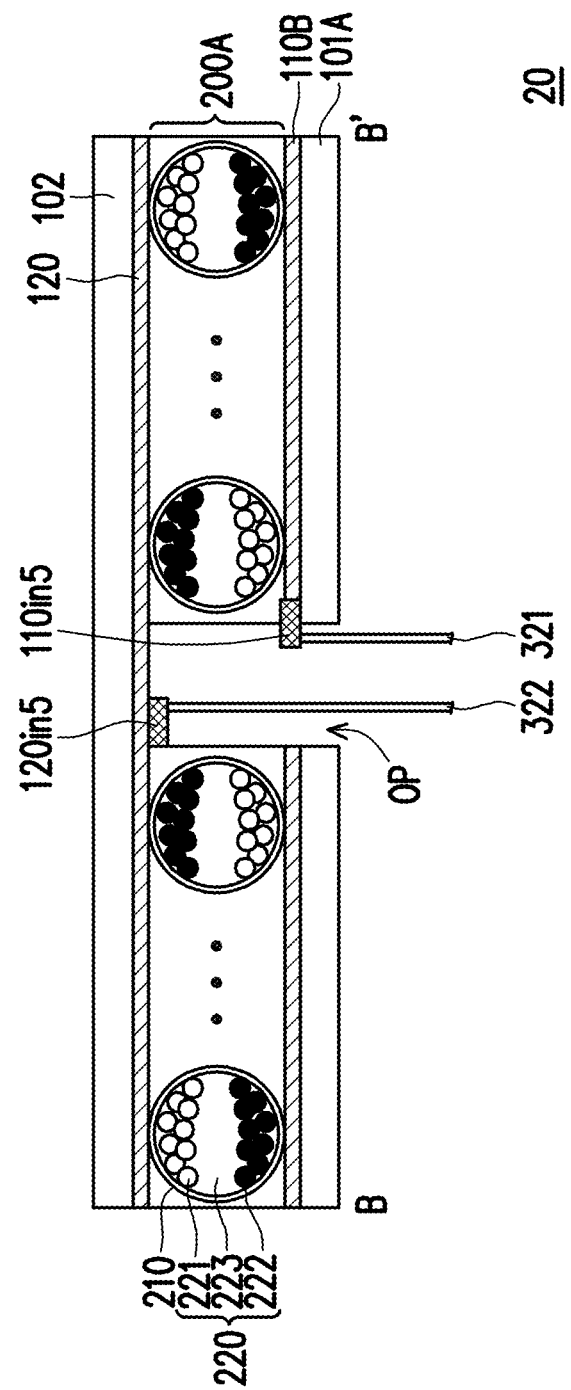
FIG. 9 is a schematic cross-sectional view of the display device of FIG. 8.
Figure 10:
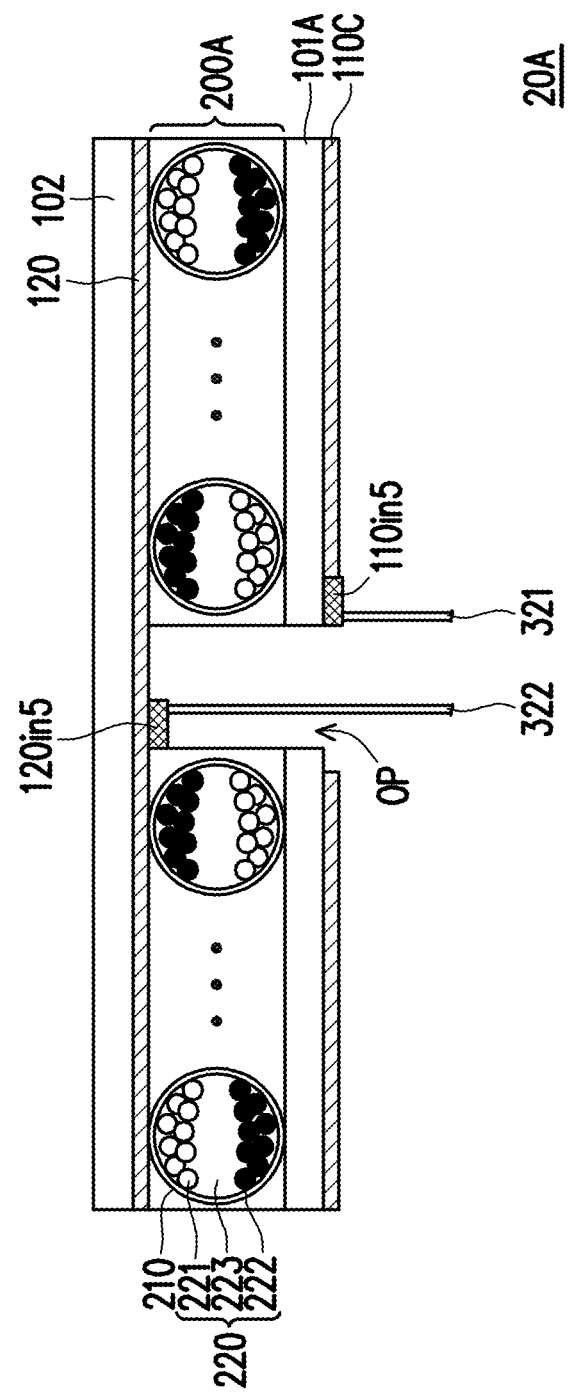
FIG. 10 is a schematic cross-sectional view of a display device according to a sixth embodiment of the present disclosure.

FIG. 8 is a schematic top view of a display device according to a fifth embodiment of the present disclosure. FIG. 9 is a schematic cross-sectional view of the display device of FIG. 8. FIG. 10 is a schematic cross-sectional view of a display device according to a sixth embodiment of the present disclosure. FIG. 9 corresponds to the sectional line B-B' of FIG. 8.

Please refer to FIG. 8 and FIG. 9, the difference between the display device 20 of this embodiment and the display device 10 of FIG. 1 and FIG. 2 is that the first substrate 101A, the first electrode 110B and the display medium layer 200A of the display device have openings OP. The opening OP may be substantially located at or near the geometric center of the first substrate 101A, and expose the voltage input terminal 110$in$5 (i.e., the third voltage input terminal) of the first electrode 110B and the voltage input terminal 120$in$5 (i.e., the sixth voltage input terminal) of the second electrode 120. It should be noted that, in this embodiment, the display device 20 is not provided with the third electrode 130 and the fourth electrode 140 as shown in FIG. 6 to serve as the third voltage input terminal of the first electrode 110B and the sixth voltage input terminal of the second electrode 120.

In addition, the display device 20 further includes a flexible circuit board 321 (i.e., a first flexible circuit board) and a flexible circuit board 322 (i.e., a second flexible circuit board). In this embodiment, the two flexible circuit boards are electrically connected to the third voltage input terminal and the sixth voltage input terminal respectively through the opening OP. However, the present disclosure is not limited thereto. As shown in FIG. 10, in the display device 20A of another embodiment, the first electrode 110C and its voltage input terminal 110$in$5 may also be disposed on one side of the first substrate 101A facing away from the display medium layer 200A. Therefore, in this embodiment, the flexible circuit board 321 may be electrically connected to the voltage input terminal 110$in$5 without extending into the opening OP.

Except for the above-mentioned differences, since the display device 20 in FIG. 8 and FIG. 9 and other components and their configuration relationships in the display device 20A of FIG. 10 are similar to the display device 10 of FIG. 2, detailed descriptions may be derived from the relevant paragraphs of the foregoing embodiments, which will not be repeated here.

Figure 11:
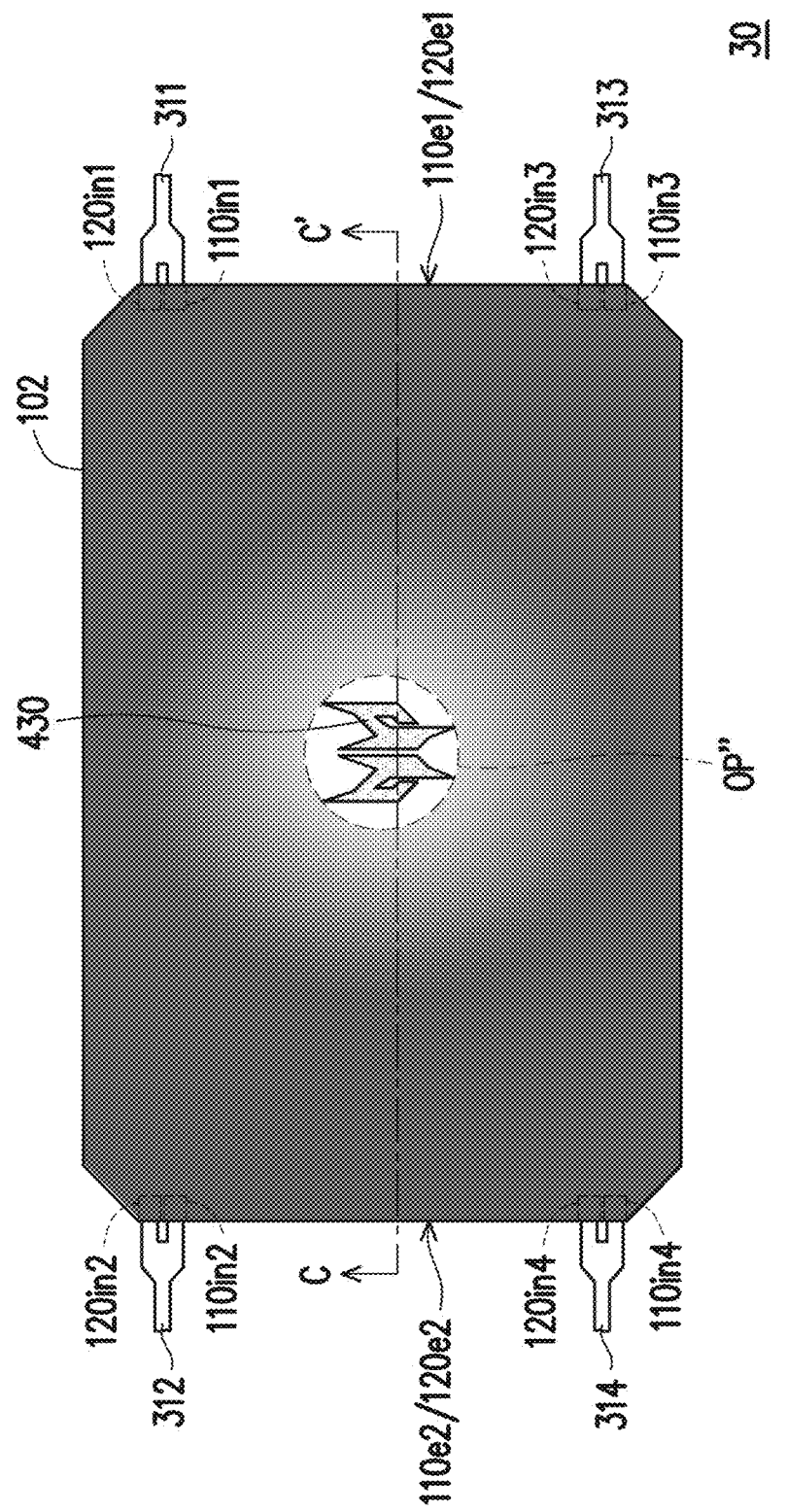
FIG. 11 is a schematic top view of a display device according to a seventh embodiment of the present disclosure.
Figure 12:
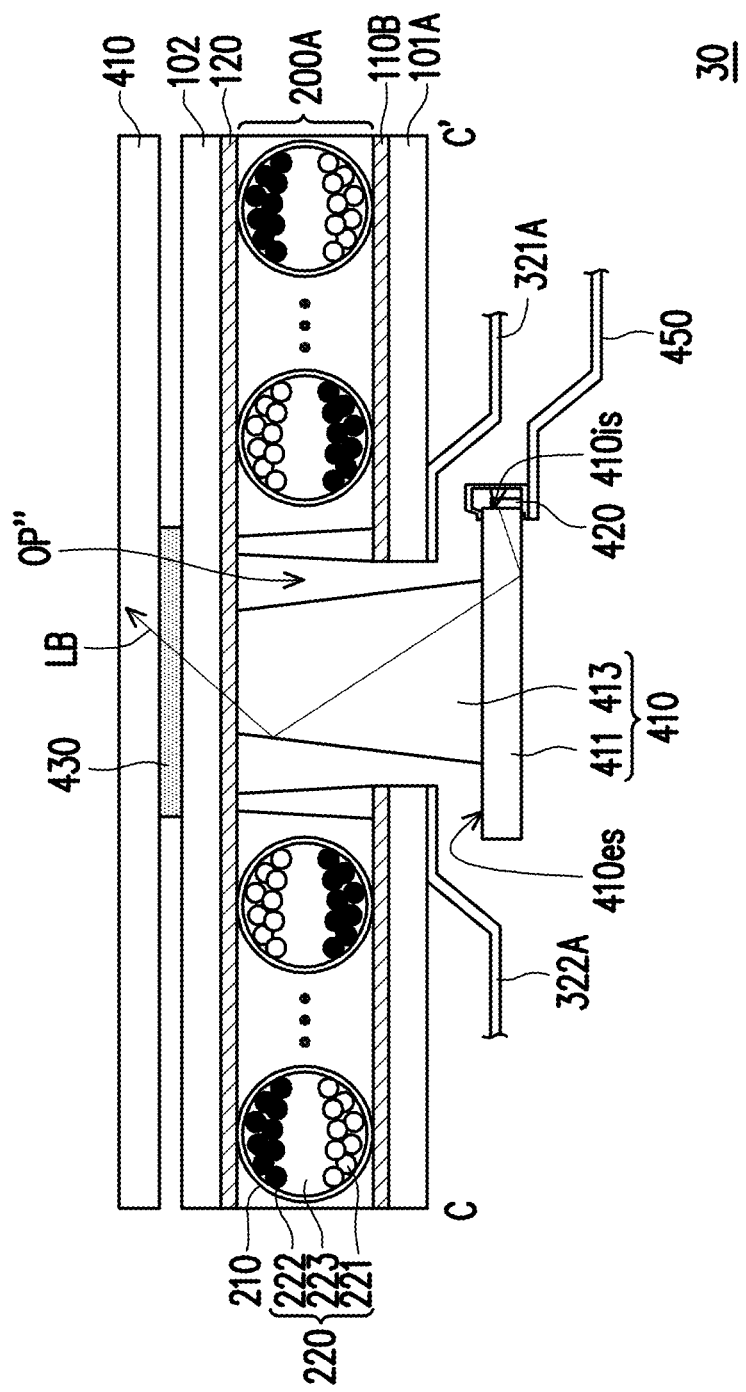
FIG. 12 is a schematic cross-sectional view of the display device of FIG. 11.

FIG. 11 is a schematic top view of a display device according to a seventh embodiment of the present disclosure. FIG. 12 is a schematic cross-sectional view of the display device of FIG. 11. FIG. 12 corresponds to the sectional line C-C' of FIG. 11. Referring to FIG. 11 and FIG. 12, in the display device 30 of this embodiment, the first substrate 101A, the first electrode 110B and the display medium layer 200A have openings OP", and the openings OP" may be substantially located at or near the geometric center of the first substrate 101A.

Different from the foregoing embodiments, the display device 30 further includes a light guide structure 410, a light source 420 and a patterned ink layer 430. The patterned ink layer 430 is disposed on the second substrate 102 and overlaps the opening OP". For example, the display device 30 may further include a transparent cover plate 410, and the patterned ink layer 430 may be directly printed on the transparent cover plate 410, but the disclosure is not limited thereto.

The light guide structure 410 extends into the opening OP'' and is adapted to guide the light LB from the light source 420 to pass through the patterned ink layer 430. In detail, the light guide structure 410 may include a light guide plate 411 and a light guide column 413. The light guide column 413 is connected to the light emitting surface 410es of the light guide plate 411 facing the patterned ink layer 430. The light source 420 is arranged on one side of the light incident surface 410is of the light guide plate 411 and may be controlled by the flexible circuit board 450.

For example, in the present embodiment, the flexible circuit board 321A and the flexible circuit board 322A connected to the first substrate 101A near the opening OP'' may be optionally electrically connected to the third voltage input terminal (not shown) of the first electrode 110B and/or the sixth voltage input terminal (not shown) of the second electrode 120 through a suitable conductive structure (not shown), so as to realize the radiation gradation effect of display grayscales (as shown in FIG. 11). It should be noted that the configuration of the voltage input terminals of the first electrode 110B and/or the second electrode 120 at the geometric center of the first substrate 101A in this embodiment may also adopt the configuration described in any of the foregoing embodiments. Therefore, for the detailed description, please refer to the relevant paragraphs of the foregoing embodiments, which will not be repeated here.

As shown in FIG. 11, by arranging the light guide structure 410 and the patterned ink layer 430 in the radiation center of the gradient display grayscale to display a predetermined pattern, the optimal visual effect for highlighting, for example, a brand logo may be achieved.

To sum up, in the display device of an embodiment of the present disclosure, two surfaces of two substrates facing each other are entirely covered with two electrodes respectively, and the two opposite side edges of the two electrodes are respectively provided with two voltage input terminals. By arranging another independently controllable voltage input terminal between two voltage input terminals of one of the electrodes, the display medium layer interposed between the two electrodes may achieve the radiation gradient grayscale display effect.

What is claimed is:

1. A display device, comprising:
    a first substrate and a second substrate, which are disposed opposite to each other;
    a first electrode, which entirely covers a surface of the first substrate and is provided with a first voltage input terminal, a second voltage input terminal and a third voltage input terminal, wherein the first voltage input terminal and the second voltage input terminal are respectively located on two opposite side edges of the first electrode, the third voltage input terminal is located between the first voltage input terminal and the second voltage input terminal;
    a second electrode, which entirely covers a surface of the second substrate and is provided with a fourth voltage input terminal and a fifth voltage input terminal, wherein the fourth voltage input terminal and the fifth voltage input terminal are respectively located on two opposite side edges of the second electrode; and
    a display medium layer, which is disposed between the first electrode and the second electrode.

2. The display device according to claim 1, wherein the first voltage input terminal, the second voltage input terminal, the third voltage input terminal, the fourth voltage input terminal and the fifth voltage input terminal are respectively used for inputting a first voltage, a second voltage, a third voltage, a fourth voltage and a fifth voltage, the third voltage is greater or less than the first voltage and the second voltage, and the fourth voltage is different from the fifth voltage.

3. The display device according to claim 1, further comprising:
    a third electrode, which is disposed on one side of the first electrode facing away from the second electrode, wherein the third electrode has a first end portion and a first extension portion, the first end portion is the third voltage input terminal, the first extension portion extends from the first end portion to a side edge of the first substrate; and
    a first insulating layer, which is disposed between the first extension portion and the first electrode.

4. The display device according to claim 3, wherein the third electrode and the first insulating layer are located between the first substrate and the first electrode, the first insulating layer covers the third electrode, and the first end portion penetrates through the first insulating layer to electrically contact the first electrode.

5. The display device according to claim 3, wherein the third electrode and the first insulating layer are located on one side of the first substrate facing away from the first electrode, the first insulating layer is located between the first substrate and the first extension portion, and the first end portion of the third electrode is electrically coupled to the first electrode.

6. The display device according to claim 3, wherein the first electrode, the third electrode and the first insulating layer are located on one side of the first substrate facing away from the display medium layer, and the first end portion of the third electrode is in electrical contact with the first electrode.

7. The display device according to claim 3, further comprising:
    a fourth electrode, which is disposed on one side of the second electrode facing away from the first electrode, wherein the fourth electrode has a second end portion and a second extension portion, the second extension portion extends from the second end portion to a side edge of the second substrate; and
    a second insulating layer, which is disposed between the second extension portion and the second electrode,
    wherein the second electrode is further provided with a sixth voltage input terminal located between the fourth voltage input terminal and the fifth voltage input terminal, and the second end portion of the fourth electrode is the sixth voltage input terminal.

8. The display device according to claim 7, wherein the first voltage input terminal, the second voltage input terminal, the third voltage input terminal, the fourth voltage input terminal, the fifth voltage input terminal and the sixth voltage input terminal are respectively used for inputting a first voltage, a second voltage, a third voltage, a fourth voltage, a fifth voltage and a sixth voltage, the third voltage is greater or less than the first voltage and the second voltage, and the sixth voltage is greater or less than the fourth voltage and the fifth voltage.

9. The display device according to claim 1, further comprising:
    a first flexible circuit board and a second flexible circuit board, wherein the second electrode is further provided with a sixth voltage input terminal located between the fourth voltage input terminal and the fifth voltage input terminal, the first substrate, the first electrode and the display medium layer have an opening, the opening exposes the sixth voltage input terminal of the second electrode, the first flexible circuit board is electrically connected to the third voltage input terminal, and the second flexible circuit board is electrically connected to the sixth voltage input terminal through the opening.

10. The display device according to claim 9, wherein the opening further exposes the third voltage input terminal of the first electrode, and the first flexible circuit board is electrically connected to the third voltage input terminal through the opening.

11. The display device according to claim 10, wherein the first voltage input terminal, the second voltage input terminal, the third voltage input terminal, the fourth voltage input terminal and the fifth voltage input terminal are respectively used for inputting a first voltage, a second voltage, a third voltage, a fourth voltage and a fifth voltage, the third voltage is greater or less than the first voltage and the second voltage, and the fourth voltage is different from the fifth voltage.

12. The display device according to claim 9, wherein the first electrode is disposed on one side of the first substrate facing away from the display medium layer.

13. The display device according to claim 12, wherein the first voltage input terminal, the second voltage input terminal, the third voltage input terminal, the fourth voltage input terminal and the fifth voltage input terminal are respectively used for inputting a first voltage, a second voltage, a third voltage, a fourth voltage and a fifth voltage, the third voltage is greater or less than the first voltage and the second voltage, and the fourth voltage is different from the fifth voltage.

14. The display device according to claim 1, wherein the first substrate, the display medium layer and the first electrode have an opening, the display device further comprises a light guide structure, a light source and a patterned ink layer, the patterned ink layer is disposed on the second substrate and overlaps the opening, the light guide structure extends into the opening and is adapted to guide a light from the light source to pass through the patterned ink layer.

15. The display device according to claim 14, wherein the light guide structure includes a light guide plate and a light guide column, the light guide column is connected to a light emitting surface of the light guide plate facing the patterned ink layer, and the light source is arranged on one side of a light incident surface of the light guide plate.

16. The display device according to claim 14, wherein the second electrode is further provided with a sixth voltage input terminal located between the fourth voltage input terminal and the fifth voltage input terminal, the opening exposes the sixth voltage input terminal of the second electrode.

17. The display device according to claim 16, further comprising:
 a first flexible circuit board and a second flexible circuit board, which are connected to the first substrate, wherein one of the first flexible circuit board and the second flexible circuit board is electrically connected to the sixth voltage input terminal of the second electrode through the opening.

18. The display device according to claim 14, wherein the first voltage input terminal, the second voltage input terminal, the third voltage input terminal, the fourth voltage input terminal and the fifth voltage input terminal are respectively used for inputting a first voltage, a second voltage, a third voltage, a fourth voltage and a fifth voltage, the third voltage is greater or less than the first voltage and the second voltage, and the fourth voltage is different from the fifth voltage.

19. The display device according to claim 1, wherein a material of the display medium layer comprises a bistable medium.

20. The display device according to claim 1, wherein a material of the first electrode and the second electrode includes metal oxides.

* * * * *